(12) United States Patent
Pinera et al.

(10) Patent No.: US 7,896,550 B1
(45) Date of Patent: Mar. 1, 2011

(54) HYDRODYNAMIC LIQUID METAL BEARING

(75) Inventors: Alex Pinera, Jupiter, FL (US); Philip C. Pelfrey, Boca Raton, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 814 days.

(21) Appl. No.: 11/799,651

(22) Filed: May 2, 2007

Related U.S. Application Data

(60) Provisional application No. 60/797,771, filed on May 4, 2006.

(51) Int. Cl.
*F16C 32/06* (2006.01)
(52) U.S. Cl. ...................... 384/107; 384/100
(58) Field of Classification Search .......... 384/97, 384/98, 100, 105, 107, 110–112, 114, 115, 384/118, 119, 121, 123, 124, 130, 132, 135, 384/143, 144, 292, 120, 286, 287, 291
See application file for complete search history.

(56) References Cited

U.S. PATENT DOCUMENTS

| | | | |
|---|---|---|---|
| 3,530,728 A * | 9/1970 | Hoffman et al. .............. 74/5 F |
| 3,964,805 A | 6/1976 | Schulien | |
| 4,395,141 A * | 7/1983 | Pietsch et al. ............... 384/147 |
| 4,427,308 A | 1/1984 | Sandberg | |
| 4,474,483 A | 10/1984 | Suzuki et al. | |
| 4,514,099 A | 4/1985 | John et al. | |
| 4,671,676 A | 6/1987 | Chen et al. | |
| 4,883,367 A | 11/1989 | Maruyama | |
| 5,017,023 A | 5/1991 | Scharrer et al. | |
| 5,073,036 A * | 12/1991 | Sutton et al. ................. 384/107 |
| 5,169,243 A * | 12/1992 | Takahashi et al. ........... 384/107 |
| 5,193,915 A | 3/1993 | Leidenfrost | |
| 5,472,283 A * | 12/1995 | Takahashi et al. ........... 384/100 |
| 5,713,670 A | 2/1998 | Goldowsky | |
| 6,071,091 A * | 6/2000 | Lemieux .................. 417/423.1 |
| 6,086,255 A * | 7/2000 | Lyon ............................ 384/12 |
| 6,208,512 B1 | 3/2001 | Goldowsky et al. | |
| 6,276,831 B1 | 8/2001 | Takahashi et al. | |
| 6,377,658 B1 | 4/2002 | Vermilyea et al. | |
| 6,857,781 B1 | 2/2005 | Sakamoto | |
| 6,932,350 B1 * | 8/2005 | Husted ....................... 277/421 |
| 6,976,679 B2 * | 12/2005 | Goss et al. .................. 277/347 |
| 7,001,073 B2 * | 2/2006 | Hoffmann et al. ........... 384/107 |

* cited by examiner

*Primary Examiner*—James Pilkington
(74) *Attorney, Agent, or Firm*—John Ryznic

(57) ABSTRACT

A hydrodynamic liquid metal bearing capable of use in a high temperature environment. The hydrodynamic bearing includes a rotating shaft with a raised portion extending into an annular groove formed within a stationary sleeve, the space formed between the two forming the liquid bearing surface. The raised portion in the shaft includes an axial passage and a radial passage to pump the liquid into a high pressure cavity formed in the annular groove. A low pressure cavity forms a recirculating passage with the high pressure cavity and the axial and radial passages such that the liquid metal recirculates with the rotation of the shaft. A collecting space formed between a labyrinth seal and a wind back seal collects any fluid that leaks into the space from the bearing. The leaked fluid is collected in a reservoir, and a pump delivers makeup liquid from the reservoir into the low pressure reservoir of the bearing. The bearing is a radial bearing, and in another embodiment is both a radial and a thrust bearing.

13 Claims, 3 Drawing Sheets

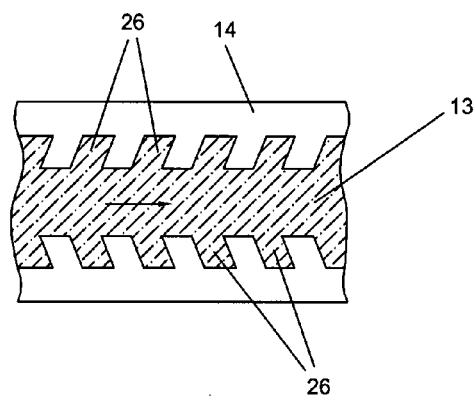
Fig 2
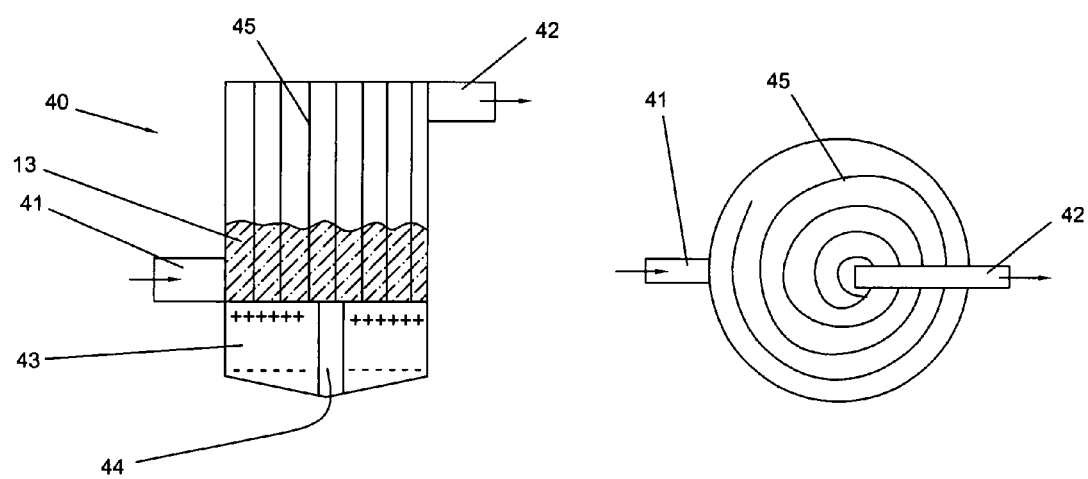
Fig 3
Fig 4

HYDRODYNAMIC LIQUID METAL BEARING

CROSS-REFERENCE TO RELATED APPLICATIONS

This application claims the benefit to an earlier filed Provisional Patent Application 60/797,771 filed on May 4, 2006 and entitled HYDRODYNAMIC LIQUID METAL BEARING.

BACKGROUND OF THE INVENTION

1. Field of the Invention

The present invention relates to a hydrodynamic bearing, and more specifically to a liquid metal hydrodynamic bearing used in a high temperature environment.

2. Description of the Related Art including information disclosed under 37 CFR 1.97 and 1.98

High speed and high temperature bearings are highly desirable for use in, for example, advanced gas turbine engines. Rolling element bearings, such as ball or roller bearings, are speed and temperature limited due to contact fatigue and viscosity breakdown of the oil coolant/lube.

Hydrodynamic bearings are bearings that ride on a film of pressurized fluid such that the rotating member is levitated, and therefore there is no metal-on-metal contact. Thus, an infinite life can be achieved.

U.S. Pat. No. 7,001,073 issued to Hoffmann et al. on Feb. 21, 2006 and entitled HYDRODYNAMIC BEARING FOR A SPINDLE MOTOR shows a hydrodynamic bearing where a plurality of hydrodynamic pressure generating grooves are formed on an outer surface of the shaft and an inner surface of the bearing sleeve that produce a fluid pressure in the bearing fluid due to rotation of the shaft.

BRIEF SUMMARY OF THE INVENTION

A hydrodynamic bearing that includes impeller passages formed in the rotating shaft and acts as a fluid impeller to pressurize the bearing fluid and direct the fluid into pressure cavities formed on the stationary bearing sleeve to form the high pressure hydrodynamic bearing. The bearing fluid is gallium in order to allow for the bearing to be used in a high temperature environment. A gas and liquid accumulation space is formed on both sides of the fluid bearing, the accumulation space being formed between a labyrinth seal and a wind back seal. The accumulation space accumulates gas and fluid leakage across the seals. A separator device is in fluid communication with the accumulation spaces to collect the gas and liquid leakage and separate the bearing fluid from the gas. A reservoir in the separator acts as a makeup reservoir for the fluid bearing.

BRIEF DESCRIPTION OF THE SEVERAL VIEWS OF THE DRAWINGS

FIG. 2 shows a detailed view of the pressure cavity of the bearing.

FIG. 3 shows a cross section side view of the liquid metal and gas separator.

FIG. 4 shows a top view of the liquid metal and gas separator.

DETAILED DESCRIPTION OF THE INVENTION

Figure 1:
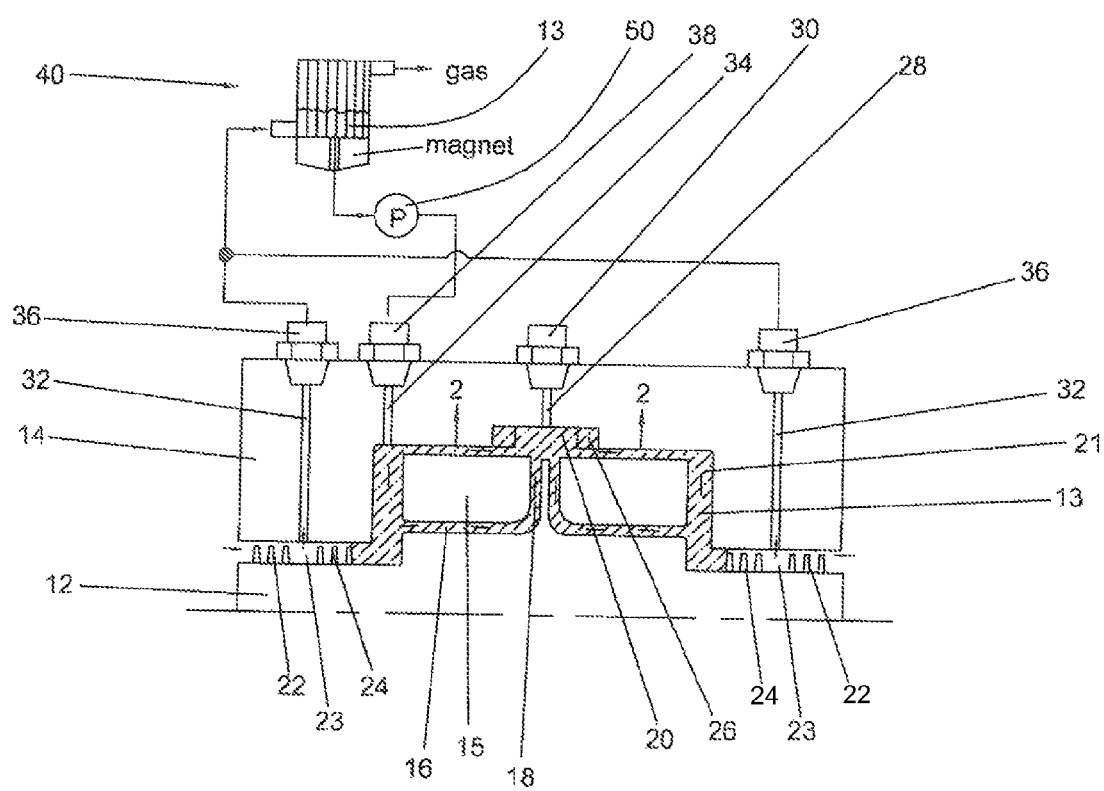
FIG. 1 shows a cross section view of the hydrodynamic liquid metal radial bearing of the present invention.

The present invention is a hydrodynamic liquid metal bearing that uses a liquid metal such as gallium as the bearing fluid to allow for operation of the bearing in high temperature environments such as in a gas turbine engine. FIG. 1 shows the hydrodynamic bearing system with a rotating shaft 12 that rotates within a stationary sleeve 14. The rotating shaft 12 includes a raised portion 15 that includes axial passages 16 and radial passages 18 to carry a liquid metal 13. The raised portion 15 includes two radial passages 18 and two axial passages 16 that form two recirculation passages in the liquid metal bearing, one of the two liquid metal passages circulating in a clockwise direction and the other circulating in a counter-clockwise direction. The stationary sleeve 14 includes an annular groove that forms a low pressure reservoir 21 on the sides of the raised portion 15 of the rotating shaft 12 and an annular channel that forms a high pressure cavity 20 of the hydrodynamic bearing. Fluid dams 26 are formed in the high pressure cavity 20 of the bearing. FIG. 2 shows a detailed view of the fluid dams and are described further below. The axial passages 16 and radial passages 18 in the rotating shaft 12 form an impeller passage that acts to pump the liquid metal 13 outward from the rotating shaft 12 and into the high pressure cavity 20. A series of labyrinth seal 22 and a wind back seal 24 are located on the shaft 12 to provide a seal for the liquid metal 13. Wind back seals are like screw threads. They help pump the liquid metal back into the cavity 21. Between the two seals 22 and 24 is a gas and liquid accumulation space 23 to accumulate the gas and liquid metal that escapes past the labyrinth seal 22 and wind back seal 24. Each side of the hydrodynamic bearing includes an escape passage 32 formed in the stationary sleeve 14 leading from the accumulation space 23 formed between the seals 22 and 24. A liquid metal supply passage 34 is also formed in the stationary sleeve 14 to deliver makeup liquid metal from a reservoir 40 to the hydrodynamic bearing. Only one makeup liquid supply passage is shown in FIG. 1. However, a second makeup liquid supply passage could be used on the opposite side of the hydrodynamic bearing if warranted.

Fluid passage connectors 36, 38, and 30 are used to connect the various fluid passages in the stationary sleeve 14 to liquid fluid reservoir 40 or a supply pump 50. In the embodiment of FIG. 1, the liquid fluid reservoir 40 is a liquid metal and gas separator that separates the liquid metal from the gas. A mixture of the liquid metal and a gas such as air enters the separator 40. The gas exits the separator 40 at the top and the liquid metal puddles at the bottom of the separator 40. A pump 50 takes liquid metal from the separator and delivers makeup liquid metal to the hydrodynamic bearing through the makeup liquid passage 34. An optional external pressure passage 28 and fluid passage connector 30 can be used to deliver a pressure to the liquid metal in order to start the bearing. At rest, the impeller passages 16 and 18 produce no pressure in the liquid metal. An external applied pressure in the liquid metal would allow for the hydrodynamic bearing to operate until the rotation of the shaft will produce enough pressure in the liquid metal to provide for the pressure to operate the bearing.

In the present invention, the liquid metal used is Gallium because it is magnetic, an excellent conductor of heat and electricity and remains in liquid state in a wide range of temperatures—from 30 degrees to more than 2,237 degrees Celsius—thus, making Gallium a good high-temperature lubricant. If the bearing of the present invention is to be used in a gas turbine engine, then Gallium would be capable of withstanding the high temperature environment. However, the present invention can be used in other rotating machinery with less extreme temperature, and therefore other liquids could be used. Water and regular oil could be used in certain situations.

The hydrodynamic bearing of FIG. 1 operates as follows. As the shaft 12 rotates and the reservoirs 20 and 21 are filled with the liquid metal (such as gallium), enough pressure is created in the liquid metal to form the hydrodynamic bearing. The labyrinth and wind back seals 22 and 24 provide a seal for the bearing. External air will leak through the outer labyrinth seal 22 and into the accumulation space 23 formed between labyrinth seals 22 and 24, while liquid metal will leak through the inner wind back seal 24 into the accumulation space 23. The leaked gas and liquid that enters the accumulation space 23 will be delivered through the escape passages 32 into the separator 40. The pump 50 will deliver makeup liquid from the separator 40 through the makeup passage 34 and into the low pressure reservoir 21 of the hydrodynamic bearing. The liquid metal flows in the direction of the arrows in FIG. 1 due to the impeller effect of the radial passages 18 when the shaft 12 rotates above a certain speed. The liquid that exits the radial passages 18 will accumulate in the high pressure cavity 20 to form the hydrodynamic bearing. The fluid dams 26 formed on the inner surface of the stationary sleeve 14 will act to hold the liquid fluid 13 and form pressure trapping dams. Because of viscous effect, the liquid metal will tend to rotate along with the rotating shaft 12 in the direction of the shaft 12. The arrow in FIG. 2 represents the direction that the liquid fluid will tend to move due to the viscous effect. The fluid dams 26 are angled in the direction shown in FIG. 2 in the opposite direction of the liquid metal flow to cause the pressure in the liquid to build.

FIG. 3 shows the details of the gas and liquid metal separator 40. An outer cylinder encloses a spiral shaped fluid passage 45 that extends from the bottom of the separator 40 to the top. A gas and liquid entrance passage 41 is located on the bottom of the separator 40, while a gas exit passage 42 is located on the top. A magnet 43 is located under the bottom of the separator 40 and acts to attract the metallic liquid metal 13 towards the bottom. The spiral passage 45 forms a swirl chamber to increase the residence time of the gas passing through the separator 40 to improve the separation process. A liquid metal fluid passage 44 is located at the bottom of the separator to remove liquid metal that has been separated from the gas. The size of the separator 40 can vary depending on the amount of gas and liquid to be separated.

Figure 5:
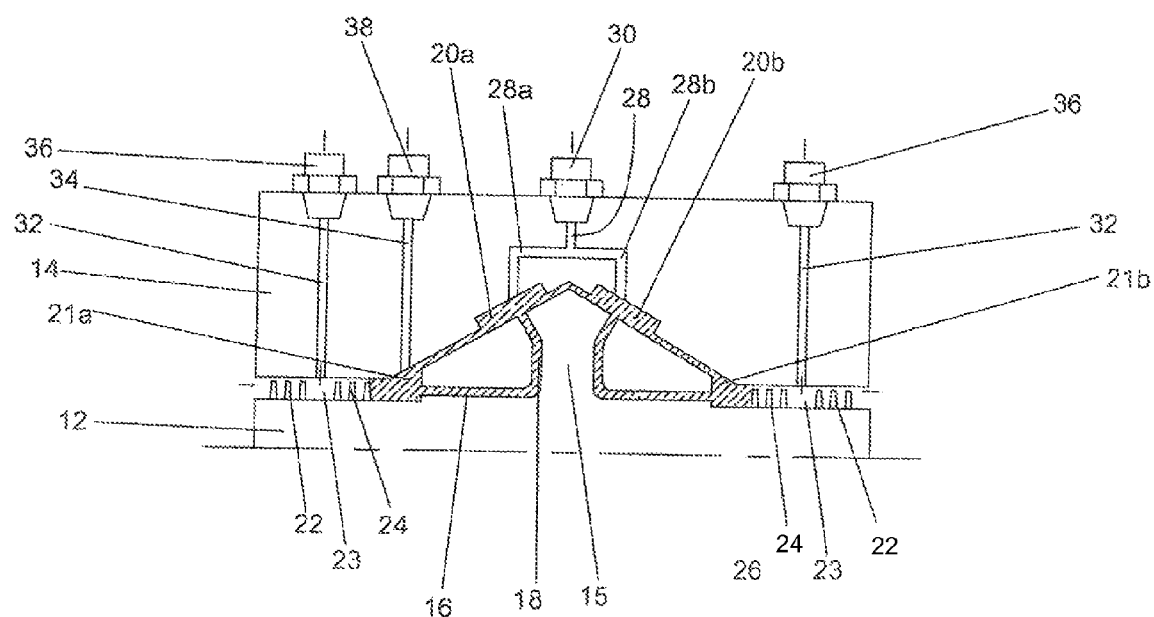
FIG. 5 shows a second embodiment of the present invention in which the hydrodynamic bearing is also a thrust bearing.

FIG. 5 shows a second embodiment of the hydrodynamic bearing of the present invention. The FIG. 1 embodiment shows the hydrodynamic bearing to act in the radial direction only. The FIG. 5 embodiment modifies the raised portion 15 of the shaft to include two angled sides that provide the thrust bearing function as well as a radial bearing. A first high pressure cavity 20a is formed on the left side angled portion of the raised portion 15, and a second high pressure cavity 20b is formed on the right side in symmetrical relation to the first high pressure cavity 21a. An axial passage 16 and a radial passage 18 located in the raised portion 15 delivers the bearing fluid 13 to the high pressure cavities 21a and 21b as in the FIG. 1 embodiment. As in the FIG. 1 embodiment, an external pressure passage 28 supplies a starting pressure for the hydrodynamic bearing. The passage 28 divides into a left side passage 28a and a right side pressure passage 28b to deliver pressure fluid to the two cavities 20a and 20b. The operation of the hydrodynamic bearing in FIG. 5 operates the same as the FIG. 1 embodiment.

We claim the following:

1. A hydrodynamic liquid metal radial bearing comprising:
   a rotating shaft;
   a stationary sleeve with an annular groove;
   a raised portion on the rotating shaft that extends into the annular groove, the raised portion includes two radials passages and two axial passages that form a first recirculation passage and a second recirculation passage for a liquid metal;
   a seal formed between the rotating shaft and the stationary sleeve to form a sealed cavity for the liquid metal and to reduce a leakage of the liquid metal;
   a liquid metal filling the sealed cavity; and
   the annular groove forming a low pressure reservoir and a high pressure cavity, the high pressure cavity comprising an annular channel formed within the annular groove, an opening of the annular channel faces the two radial passages such that liquid metal discharged from the two radial passages flows into the annular channel.

2. The hydrodynamic liquid metal radial bearing of claim 1, and wherein:
   the seal includes an accumulation space, a labyrinth seal located outward from the accumulation space and the liquid metal, and a wind back seal located between the accumulating space and the liquid metal in the bearing; and
   an escape passage connected to the accumulation space to remove fluid that has collected in the accumulating space.

3. The hydrodynamic liquid metal radial bearing of claim 2, and wherein:
   the escape passage is connected to a reservoir to collect the liquid metal; and
   the reservoir is connected by a pump to supply makeup liquid metal to the liquid metal bearing.

4. The hydrodynamic liquid metal radial bearing of claim 1, and wherein:
   the liquid metal is a non-solid state from 30 to 2,000 degrees Celsius.

5. The hydrodynamic liquid metal radial bearing of claim 4, and wherein:
   the liquid metal is Gallium.

6. The hydrodynamic liquid metal radial bearing of claim 1, and wherein:
   the low pressure reservoir is located between the high pressure cavity and the two axial passages such that rotation of the shaft recirculates the liquid metal through the two radial passages into the high pressure cavity, into the low pressure reservoir, then into the two axial passages, and back into the two radial passages.

7. The hydrodynamic liquid metal radial bearing of claim 6, and further comprising:
   an escape passage is connected to a reservoir to collect the liquid metal; and
   the reservoir is connected by a pump to supply makeup liquid metal to the low pressure reservoir.

8. The hydrodynamic liquid metal radial bearing of claim 1, and wherein:
   the raised portion and the annular groove form a fluid bearing surface parallel to a rotational axis of the rotating shaft.

9. The hydrodynamic liquid metal radial bearing of claim 1, and wherein:
   the raised portion and the annular groove form a fluid bearing surface at an angle to a rotational axis of the rotating shaft.

10. The hydrodynamic liquid metal radial bearing of claim 1, and further comprising:

the high pressure cavity formed in the annular groove at the outlet of the radial fluid dams are formed within the annular channel to form pressure tapping dams.

11. The hydrodynamic liquid metal radial bearing of claim 10, and further comprising:

an external pressure passage connected to the high pressure cavity to supply a high pressure to the liquid bearing when starting.

12. The hydrodynamic liquid metal radial bearing of claim 1, and wherein:

the raised portion and the annular groove form an inverted V-shaped bearing surface in which one of the recirculation passages is on one side of the tip of the V and the other recirculation passage is on the other side of the tip of the V such that the fluid bearing also acts as a thrust bearing.

13. The hydrodynamic liquid metal radial bearing of claim 1, and wherein:

the hydrodynamic liquid bearing is also a thrust bearing.

* * * * *